(12) United States Patent
Kiryuu et al.

(10) Patent No.: US 12,392,610 B2
(45) Date of Patent: Aug. 19, 2025

(54) REFERENCE POINT INDICATING APPARATUS

(71) Applicant: TOPCON CORPORATION, Tokyo-to (JP)

(72) Inventors: Noriyasu Kiryuu, Tokyo-to (JP); Ryosuke Jinnouchi, Tokyo-to (JP); Nobuyuki Nishita, Tokyo-to (JP)

(73) Assignee: TOPCON CORPORATION, Tokyo-to (JP)

( * ) Notice: Subject to any disclaimer, the term of this patent is extended or adjusted under 35 U.S.C. 154(b) by 388 days.

(21) Appl. No.: 18/105,014

(22) Filed: Feb. 2, 2023

(65) Prior Publication Data
US 2023/0243652 A1 Aug. 3, 2023

(30) Foreign Application Priority Data

Feb. 3, 2022 (JP) ................................ 2022-015536
Dec. 15, 2022 (JP) ................................ 2022-199990

(51) Int. Cl.
*G01B 15/06* (2006.01)
*G01C 15/06* (2006.01)

(52) U.S. Cl.
CPC .................... *G01C 15/06* (2013.01)

(58) Field of Classification Search
CPC ..................................................... G01C 15/06
USPC .................................................. 33/293–296
See application file for complete search history.

(56) References Cited

U.S. PATENT DOCUMENTS

| | | | | |
|---|---|---|---|---|
| 2,981,000 A | * | 4/1961 | Long ..................... | G01C 15/06 33/1 H |
| 3,442,016 A | * | 5/1969 | Kaye ..................... | G01C 15/06 33/293 |
| 4,549,360 A | * | 10/1985 | Allen ..................... | G01C 15/06 33/286 |
| 5,231,539 A | * | 7/1993 | McMillen .............. | G02B 5/122 359/876 |

(Continued)

FOREIGN PATENT DOCUMENTS

| | | |
|---|---|---|
| CN | 113280721 A | 8/2021 |
| JP | 11-34582 A | 2/1999 |
| JP | 2002-67584 A | 3/2002 |

OTHER PUBLICATIONS

Woodpeckers: "MT Center Gauge & Doweling Jig | Woodpeckers Woodworking Tools", Oct. 4, 2019.

(Continued)

*Primary Examiner* — George B Bennett
(74) *Attorney, Agent, or Firm* — Nields, Lemack & Frame, LLC

(57) ABSTRACT

Provided is a reference point indicating apparatus comprising at least two link plates, a slide slit formed in each link plate, an indicator configured to be slidable along each slide slit and to be provided at an intersection of a center line of each slide slit, and at least three leg portions configured to be provided on the same circumference centered on the indicator, wherein the indicator is configured to be located on an intersection of a perpendicular bisector of each straight line connecting centers of leg portions adjacent to each other, the leg portions are configured to be contactable with an object 3 by sliding the indicator, the indicator is configured to indicate a reference point of the object in a state where each leg portion is in contact with the object.

15 Claims, 12 Drawing Sheets

(56) References Cited

U.S. PATENT DOCUMENTS

| | | | | |
|---|---|---|---|---|
| 6,185,055 | B1* | 2/2001 | Feist | G02B 5/122 359/834 |
| 7,810,246 | B2* | 10/2010 | Falk | G01C 15/02 33/645 |
| 7,913,405 | B2* | 3/2011 | Berg | G01C 15/06 33/228 |
| 8,567,076 | B2* | 10/2013 | Ortleb | G01C 15/06 33/228 |
| 10,264,221 | B2* | 4/2019 | Kumagai | G01C 15/002 |
| 10,690,497 | B2 | 6/2020 | Nagashima et al. | |
| 11,313,680 | B2* | 4/2022 | Kumagai | G01S 17/08 |
| 11,506,492 | B2* | 11/2022 | Nakaniwa | G01C 15/06 |
| 11,536,568 | B2* | 12/2022 | Nishita | G01C 15/06 |
| 12,085,378 | B2* | 9/2024 | Müller | G01B 11/002 |
| 2002/0144416 | A1* | 10/2002 | Ghesla | G02B 5/122 33/293 |
| 2009/0279968 | A1 | 11/2009 | Kiezel | |
| 2021/0270640 | A1* | 9/2021 | Yasutomi | G01D 5/3473 |
| 2023/0102020 | A1* | 3/2023 | Hinderling | G02B 5/122 359/509 |
| 2023/0184551 | A1* | 6/2023 | Reimann | G01C 15/06 702/5 |
| 2023/0243633 | A1 | 8/2023 | Kiryuu et al. | |
| 2024/0302167 | A1* | 9/2024 | Graesser | G01C 15/006 |
| 2025/0123100 | A1* | 4/2025 | Johnston | G01C 15/002 |

OTHER PUBLICATIONS

European communication dated Jul. 27, 2023 in co-pending European patent application No. 23154654.0.

European communication dated Jul. 20, 2023 in corresponding European patent application No. 23154657.3.

* cited by examiner

REFERENCE POINT INDICATING APPARATUS

BACKGROUND OF THE INVENTION

The present invention relates to a reference point indicating apparatus which indicates a point used as a reference for measurement of various members.

In a case where measuring positions of various members constructed at a construction site or the like, it is necessary to indicate reference points for measurement of various members. For instance, if a member is a piled concrete pile and a center of the concrete pile is indicated as a reference point, as a conventional method, an upper surface of a concrete pile which has been pile driving is measured with a convex or the like, and a center position is obtained and a center point is marked by a writing material or the like.

In such a conventional method, it is easy to come up to human errors. Further, there is a problem that an accuracy is determined depending on a skill level of a worker, and working efficiency is not sufficient.

SUMMARY OF INVENTION

It is an object of the present invention to provide a reference point indicating apparatus which is capable of easily indicating a point used as a reference of measurement of a predetermined member.

To attain the object as described above, a reference point indicating apparatus according to the present embodiment includes at least two link plates, a slide slit formed in each link plate, an indicator configured to be slidable along each slide slit and to be provided at an intersection of a center line of each slide slit, and at least three leg portions configured to be provided on the same circumference centered on the indicator, wherein the indicator is configured to be located on an intersection of a perpendicular bisector of each straight line connecting centers of leg portions adjacent to each other, the leg portions are configured to be contactable with an object by sliding the indicator, the indicator is configured to indicate a reference point of the object in a state where each leg portion is in contact with the object.

Further, in the reference point indicating apparatus according to a preferred embodiment, the link plate is configured to be a fan shape with a predetermined central angle and to be rotatably linked via a link point with one peripheral edge of an adjacent link plate, wherein the center line of the slide slit is configured to be located on a perpendicular bisector of a straight line connecting both peripheral edges of the link plate.

Further, in the reference point indicating apparatus according to a preferred embodiment, the link plate is configured to be T-shape, and to have a shaft portion having a link point for being rotatably linked with an adjacent link plate, and a slide portion in which the slide slit is formed, wherein the center line of the slide slit is configured to be located on a perpendicular bisector of the shaft portion.

Further, in the reference point indicating apparatus according to a preferred embodiment, a circle passing through the link point centered on the indicator and a circle passing through the leg portion centered on the indicator are configured to become the same circle or a concentric circle.

Further, in the reference point indicating apparatus according to a preferred embodiment, a slit to be capable of visually recognizing a contact between the leg portion and the object is formed in the link plate.

Further, in the reference point indicating apparatus according to a preferred embodiment, further comprises the leg portion having a tilting portion which is tiltable in a contact direction with respect the object, a fixed marker is configured to be provided on the link plate, and a movable marker is configured to be provided in a upper surface of the tilting portion, wherein the tilting portion is configured to be energized such that a lower edge protrudes in a direction of the indicator from the leg portion, wherein the leg portion and a lower edge of the tilting portion are flush by being contacted with the object, and the fixed marker and the movable marker coincide with each other.

Further, in the reference point indicating apparatus according to a preferred embodiment, the indicator includes a holder, an offset bar rotatably provided centered on the holder and bored a guide groove, and a reference object slidably provided along the guide groove, wherein the reference object is configured to be capable of indicating an offset point which is offset in a predetermined direction with respect to a reference point by a predetermined distance.

Further, in the reference point indicating apparatus according to a preferred embodiment, an energizing means is configured to energize a circle centered on the indicator and passing through each leg portion in a direction of expansion or contraction is provided.

Further, in the reference point indicating apparatus according to a preferred embodiment, the indicator is configured to include a retro-reflector or a transfer tool.

Further, in the reference point indicating apparatus according to a preferred embodiment, the indicator is configured to include a prism attached via an expander capable of being expanded and contracted in an up-and-down direction.

Further, in the reference point indicating apparatus according to a preferred embodiment, a height adjustment member is provided to be adjacent each leg portion, wherein a lower surface of the height adjustment member is configured to be located on the same plane as a lower surface of the indicator.

Furthermore, in the reference point indicating apparatus according to a preferred embodiment, the height adjustment member includes a guide portion having a thickness gradually increasing from a center side toward an outer peripheral side.

According to the present embodiment, since the reference point indicating apparatus comprises at least two link plates, a slide slit formed in each link plate, an indicator configured to be slidable along each slide slit and to be provided at an intersection of a center line of each slide slit, and at least three leg portions configured to be provided on the same circumference centered on the indicator, wherein the indicator is configured to be located on an intersection of a perpendicular bisector of each straight line connecting centers of leg portions adjacent to each other, the leg portions are configured to be contactable with an object by sliding the indicator, the indicator is configured to indicate a reference point of the object in a state where each leg portion is in contact with the object. As a result, it is no longer necessary to measure a size of the object in order to indicate the reference point, and it is possible to shorten a working time and to reduce a working labor.

DETAILED DESCRIPTION OF THE PREFERRED EMBODIMENTS

A description will be given below on embodiments of the present invention by referring to the attached drawings.

First, by referring to FIG. 1, a description will be given below on a first embodiment of the present invention.

Figure 1:
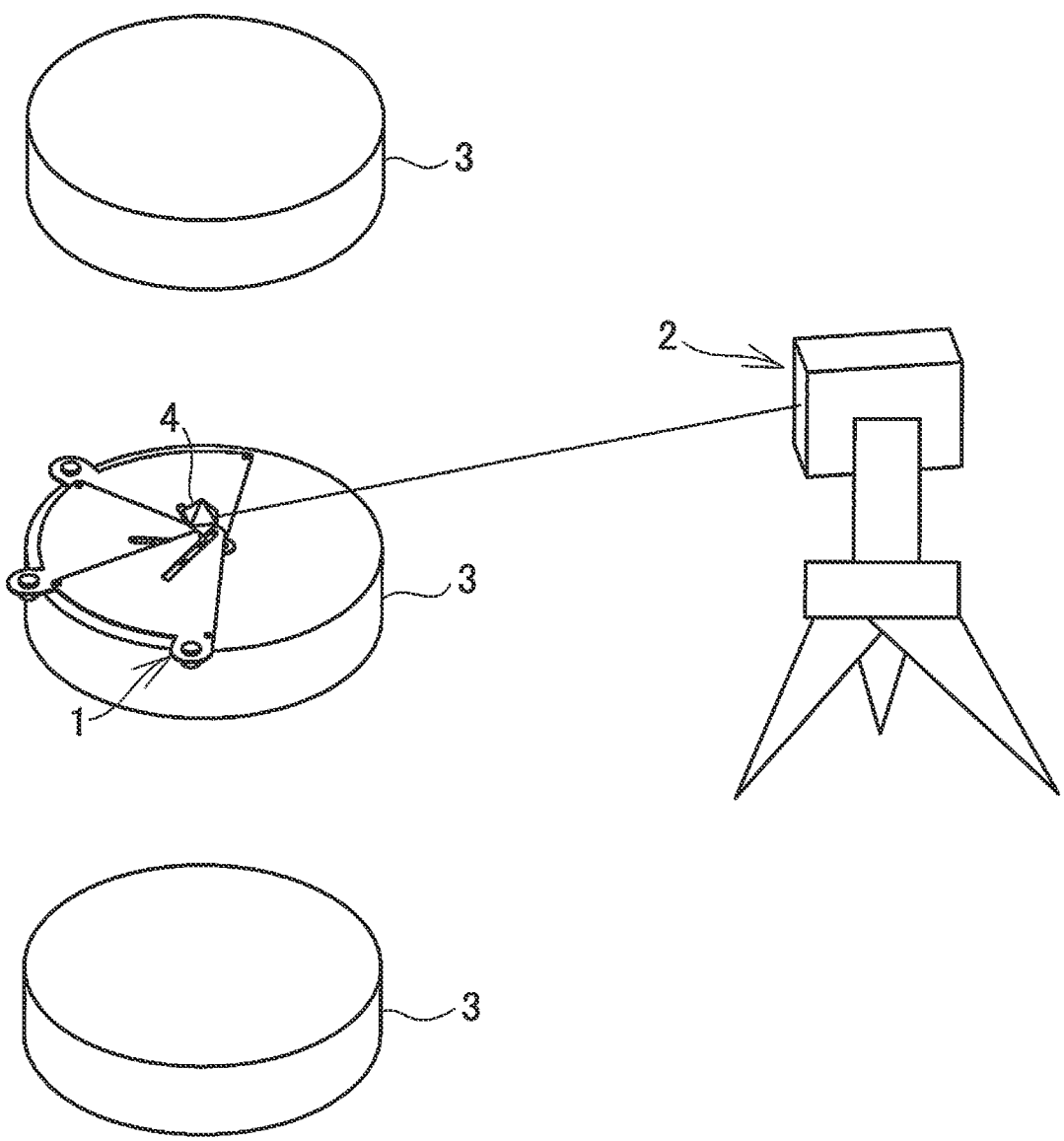
FIG. 1 is an explanatory drawing to explain an indication of a reference point by a reference point indicating apparatus according to a first embodiment.

In FIG. 1, reference numeral 1 denotes a reference point indicating apparatus, and reference numeral 2 denotes a surveying instrument, such as a total station, which is provided at a known position and is capable of measuring three-dimensional coordinates of an object.

The reference point indicating apparatus 1 is attached to an object 3 to be measured. The object 3 is a construction member provided at a construction site, such as a plurality of cylindrical concrete piles which has been pile driving at a construction site.

The reference point indicating apparatus 1 is capable of indicating a reference point of the object 3, for instance, a center of a circle. For instance, a writing material, such as a marker, is provided on the reference point indicating apparatus 1, and it is possible to mark a center point of a circle by the writing material.

Alternatively, as shown in FIG. 1, a retro-reflector, such as a prism 4, as a reference object for identifying a position of a reference point may be provided in the reference point indicating apparatus 1. By measuring the prism 4 with the surveying instrument 2, it is possible to obtain three-dimensional coordinates of a center point of the object 3 as a reference point. It is to be noted that a reflective sheet or the like may be used as a retro-reflector. Further, a reference object provided on the reference point indicating apparatus 1 is not limited to a retro-reflector. For instance, any object, such as a three-dimensional object, a light emitter, or a target marker, which is measurable as a reference point (for instance, center) may be provided on the reference point indicating apparatus 1 as a reference object.

Next, a description will be given on the reference point indicating apparatus 1 by referring to FIG. 2A and FIG. 2B.

The reference point indicating apparatus 1 has at least two link plates with a predetermined central angle. In the first embodiment, the reference point indicating apparatus 1 has three fan-shaped link plates with the same radius as a central angle, such as a 60°, as a predetermined central angle. That is, the reference point indicating apparatus 1 is configured of link plates of a plurality of the same shape. In the following description, a peripheral edge of an arc centered on a center of a fan shape of each link plate is referred to as a peripheral edge of each link plate, and two peripheral edges of each link plate is collectively referred to as both peripheral edges.

A first link plate 5 and a second link plate 6 are rotatably linked in an overlapped state at a first link point 7 located at a peripheral edge (one peripheral edge of the second link plate 6). Further, the second link plate 6 and a third link plate 8 are rotatably linked in an overlapped state at a second link point 9 located at a peripheral edge (the other peripheral edge of the second link plate 6). That is, the second link plate 6 is linked to the first link plate 5 and the third link plate 8 at both peripheral edges, and each link plate 5, 6, and 8 does not rotate solely.

It is to be noted that, in first embodiment, the second link plate 6 overlaps on the third link plate 8, and the first link plate 5 overlaps on the second link plate 6. That is, it is possible to overlap three link plates each other.

Figure 2A:
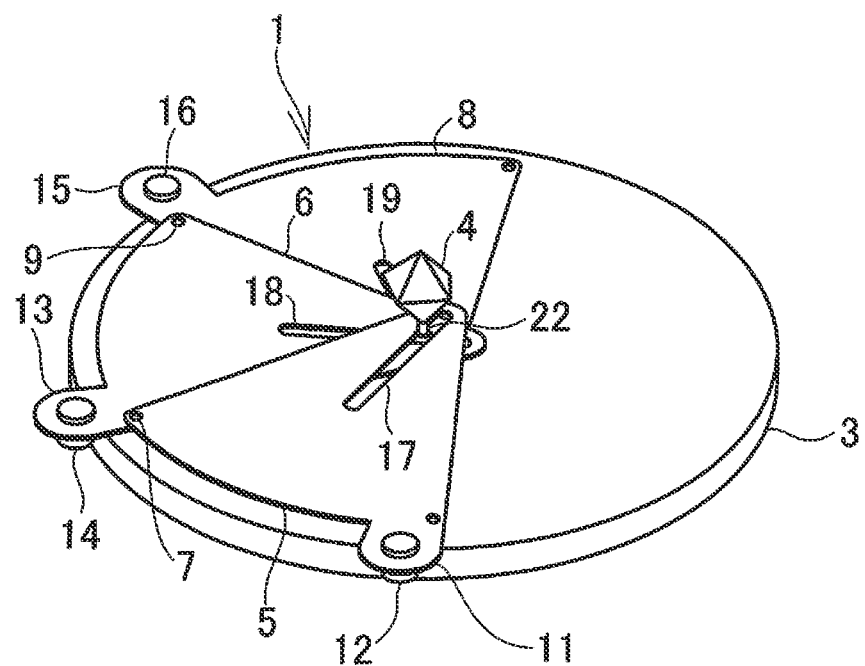
FIG. 2A and FIG. 2B are perspective diagrams to show a reference point indicating apparatus according to the first embodiment.
Figure 2B:
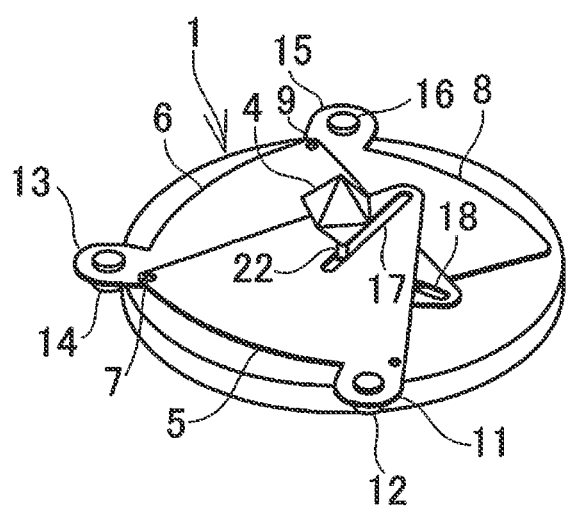

A first protruded piece 11 radially protruding from a fan-shaped arc is provided at one peripheral edge of the first link plate 5, that is, a peripheral edge at a side opposite to the first link point 7 in FIG. 2A, and a cylindrical first leg portion 12 protruding downward is provided on the first protruded piece 11. Similarly, a second protruded piece 13 radially protruding from a fan-shaped arc is provided at one peripheral edge of the second link plate 6, that is, a peripheral edge at a side of the first link point 7 in FIG. 2A, and a cylindrical second leg portion 14 protruding downward is provided on the second protruded piece 13. A third protruded piece 15 radially protruding from a fan-shaped arc is provided at one peripheral edge of the third link plate 8, that is, a peripheral edge at a side opposite to the second link point 9 in FIG. 2A, and a cylindrical third leg portion 16 protruding downward is provided on the third protruded piece 15. It is to be noted that the first leg portion 12, the second leg portion 14, and the third leg portion 16 are cylinders having the same radius. Further, since each leg portion 12, 14, and 16 only needs to have a height that allows a peripheral surface of each leg portion 12, 14, and 16 to be in contact with a peripheral surface of the object 3, a height of each leg portion 12, 14, and 16 may be the same or may be different from each other.

Further, a slit-shaped first slide slit 17 extending in a radial direction is bored in the first link plate 5. Similarly, a slit-shaped second slide slit 18 extending in a radial direction is bored in the second link plate 6, and a slit-shaped third slide slit 19 extending in a radial direction is bored in the third link plate 8.

A center of the first slide slit 17 is located on a perpendicular bisector of a straight line (chord of a fan-shaped arc) connecting both peripheral edges of the first link plate 5, and a center line extending in a longitudinal direction of the first slide slit 17 coincides with the perpendicular bisector. Similarly, a center of the second slide slit 18 is located on a perpendicular bisector of a straight line (chord of a fan-shaped arc) connecting both peripheral edges of the second link plate 6, and a center line extending in a longitudinal direction of the second slide slit 18 coincides with the perpendicular bisector. Further, a center of the third slide slit 19 is located on a perpendicular bisector of a straight line (chord of a fan-shaped arc) connecting both peripheral edges of the third link plate 8, and a center line extending in a longitudinal direction of the third slide slit 19 coincides with the perpendicular bisector.

Further, the reference point indicating apparatus 1 has a disk-shaped base plate 21 (to be described later) and a cylindrical holder 22 protruding upward from a center of the base plate 21. On the holder 22, a writing material or a marking-off pin as a transfer tool for marking a center point on the object 3, or the prism 4 as a retro-reflector shown in FIG. 2 is attachable to and detachable from the holder 22. It is to be noted that a height from a lower surface of the base plate 21 to an optical center of the prism 4 is known, and an optical center is located on a center line of the holder 22. Further, an indicator is constituted of the base plate 21, the holder 22, a transfer tool or a retro-reflector.

The holder 22 is slidably inserted across the first slide slit 17, the second slide slit 18, and the third slide slit 19. A center of the holder 22 at this time is located at an intersection of a center line of the first slide slit 17, a center line of the second slide slit 18, and a center line of the third slide slit 19. Therefore, the first link plate 5, the second link plate 6, and the third link plate 8 rotate relatively each other as the holder 22 slides though each slide slit 17, 18, and 19.

It is to be noted that a perpendicular bisector of a line connecting the first link point 7 and the second link point 9 coincides with a center line of the second slide slit 18. Further, the first link point 7 and the second link point 9 are located on an arbitrary point on a center line of the second slide slit 18, that is, located on the same circumference centered on the holder 22 (the prism 4), which is slid to an arbitrary position of the second slide slit 18.

Further, positions of the first leg portion 12, the second leg portion 14, and the third leg portion 16 are set such that an intersection of a perpendicular bisector of a straight line connecting a center of the first leg portion 12 and a center of the second leg portion 14, and of a perpendicular bisector of a straight line connecting a center of the second leg portion 14 and a center of the third leg portion 16 coincides with a center of the holder 22. That is, each center of the first leg portion 12, the second leg portion 14, and the third leg portion 16 is located on a concentric circle centered on the holder 22.

Therefore, a circle passing through the first link point 7 and the second link point 9, and a circle passing through a center of the first leg portion 12, a center of the second leg portion 14, and a center of the third leg portion 16 has a relationship of being the concentric circle centered on the holder 22 (the prism 4).

The holder 22 is simultaneously slidable along the first slide slit 17, the second slide slit 18, and the third slide slit 19. For instance, as shown in FIG. 2B, when the holder 22 is slid along the second slide slit 18 to an outer peripheral side, the first link plate 5 rotates counter clockwise centered on the first link point 7, the holder 22 slides along the first slide slit 17 to an outer peripheral side by a same distance which slides along the second slide slit 18. Further, the third link plate 8 rotates clockwise centered on the second link point 9, the holder 22 slides along the third slide slit 19 to an outer peripheral side by a same distance which slides along the second slide slit 18.

As shown in FIG. 2A, when the holder 22 is slid to a center side along the second slide slit 18, the first link plate 5 and the second link plate 6 rotate by a motion contrary to the above-descried motion, and the holder 22 slides.

The second slide slit 18 is located on a perpendicular bisector of the first link point 7 and the second link point 9, and the holder 22 slides along the perpendicular bisector. Therefore, even if the holder 22 is slid, a distance from the first link point 7 to the holder 22 and a distance from the second link point 9 to the holder 22 always coincide with each other.

Further, a circle passing through each center of the first leg portion 12, the second leg portion 14, and the third leg portion 16 has a relationship of being a concentric circle with a circle which is centered on the holder 22 and passes through the first link point 7 and the second link point 9. Therefore, even in a case where the holder 22 is slid, a distance from the holder 22 to the first leg portion 12, a distance from the holder 22 to the second leg portion 14, and a distance from the holder 22 to the third leg portion 16 always coincide with one another. Similarly, a relationship between the first link point 7 and the second leg portion 14 and a relationship between the second link point 9 and the third leg portion 16 do not change It is to be noted that, the above description will be given on the holder 22 sliding through the second slide slit 18. On the other hand, the holder 22 is located at an intersection of a center line of the first slide slit 17, a center line of the second slide slit 18, and a center line of the third slide slit 19. Therefore, a case of the holder 22 sliding through the first slide slit 17 and a case of the holder 22 sliding through the third slide slit 19 are also the same as a case of the holder 22 sliding through the second slide slit 18.

As described above, even if the holder 22 is moved to any position in each slide slit 17, 18, and 19, a center of the holder 22 (a center of the prism 4) is located on an intersection of a perpendicular bisector of a straight line connecting the center of the first leg portion 12 and the center of the second leg portion 14 and a perpendicular bisector of a straight line connecting the center of the second leg portion 14 and the center of the third leg portion 16. That is, a center of the holder 22 is located at a center of a circle passing through a center of the first leg portion 12, a center of the second leg portion 14, and a center of the third leg portion 16.

Therefore, in a state where a lower surface of the base plate 21 is in contact with a surface of the object 3, when the holder 22 is slid in such a manner that each leg portion 12, 14, and 16 is in contact with a peripheral surface of the cylindrical object 3, each link plate 5, 6, and 8 are rotated via the first link point 7 and the second link point 9.

Since a circle passing through a contact point between each leg portion 12, 14, and 16 and the object 3, and a circle passing through a center of each leg portion 12, 14, and 16 are a concentric circle, it is possible to move the holder 22 onto a center of the object 3 and to indicate a reference point by bringing each leg portion 12, 14, and 16 into contact with a peripheral surface of the object 3.

As described above, the reference point indicating apparatus 1 is capable of changing a size of a circle passing through three leg portions 12, 14, and 16 by sliding the holder 22. Further, even in a case where a size of a circle is changed, the holder 22 and the prism 4 provided on the holder 22 are always located at a center of a circle.

Therefore, regardless of a diameter of the object 3, merely by rotating each link plate 5, 6, and 8 such that the reference point indicating apparatus 1 is installed in the object 3 and each leg portion 12, 14, and 16 is in contact with a peripheral surface of the object 3, it is possible to automatically move the holder 22 on a center of the object 3 and to indicate a reference point.

Further, by measuring the prism 4 attached to the holder 22 with the surveying instrument 2, it is possible to obtain a center of the object 3, that is, three-dimensional coordinates of a reference point based on a measurement result of the prism 4 and a known height of the prism 4.

Therefore, since it is not necessary to measure a size or the like of the object 3, but merely to install the reference point indicating apparatus 1 on the object 3 and to rotate each link plate 5, 6, and 8, in order to indicate a reference point, it is possible to reduce a working time and to reduce work labor.

It is to be noted that, in the first embodiment, although the holder 22 is manually slid. On the other hand, energizing means, such as springs, may respectively be provided between the first link plate 5 and the second link plates 6 and between the second link plate 6 and the third link plate 8. By configuring to energize in a direction in which a circle inscribed in each leg portion 12, 14, and 16 becomes smaller by the energizing means, it is possible to automatically bring each leg portion 12, 14, and 16 into contact with a peripheral surface of the object 3 merely by putting the reference point indicating apparatus 1 on the object 3, and to further improve a workability.

Figure 3:
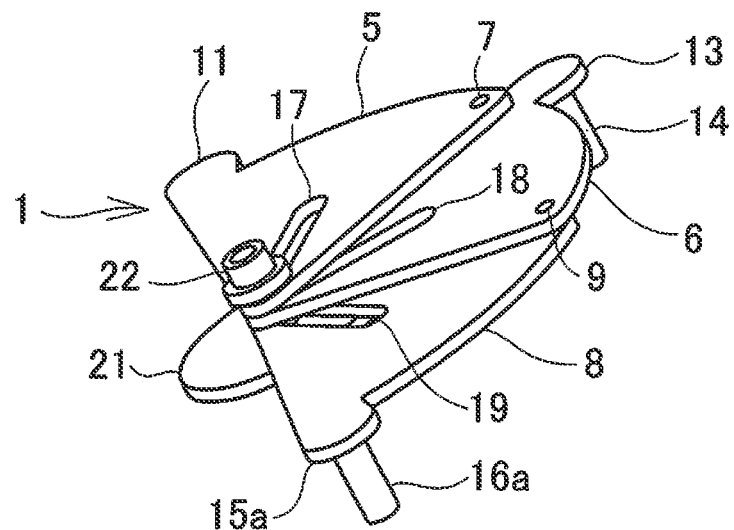
FIG. 3 is a perspective diagram to show a reference point indicating apparatus according to a modified embodiment of the first embodiment.

Further, a position where each leg portion 12, 14, and 16 is provided is not limited to arrangements as in the first embodiment. FIG. 3 shows s first modified embodiment of the first embodiment. In the modified embodiment, a position of a third leg portion 16a is different from a position of the third leg portion 16 in the first embodiment.

In the modified embodiment of the first embodiment, a third protruded piece 15a radially protrudes from a peripheral edge at a side different from the second link point 9, and the third leg portion 16a is provided on the third protruded piece 15a. Also in the modified embodiment of the first embodiment, it is configured to locate a center of the holder 22 on an intersection of a perpendicular bisector of a straight line connecting a center of the first leg portion 12 and a center of the second leg portion 14, and a perpendicular bisector of a straight line connecting a center of the second leg portion 14 and a center of the third leg portion 16a.

Therefore, merely by rotating each link plate 5, 6, and 8 such that each leg portion 12, 14, and 16a is in contact with a peripheral surface of the object 3, it is possible to move the holder 22 and the prism 4 provided on the holder 22 on a center of the object 3 and to indicate a reference point.

Figure 4:
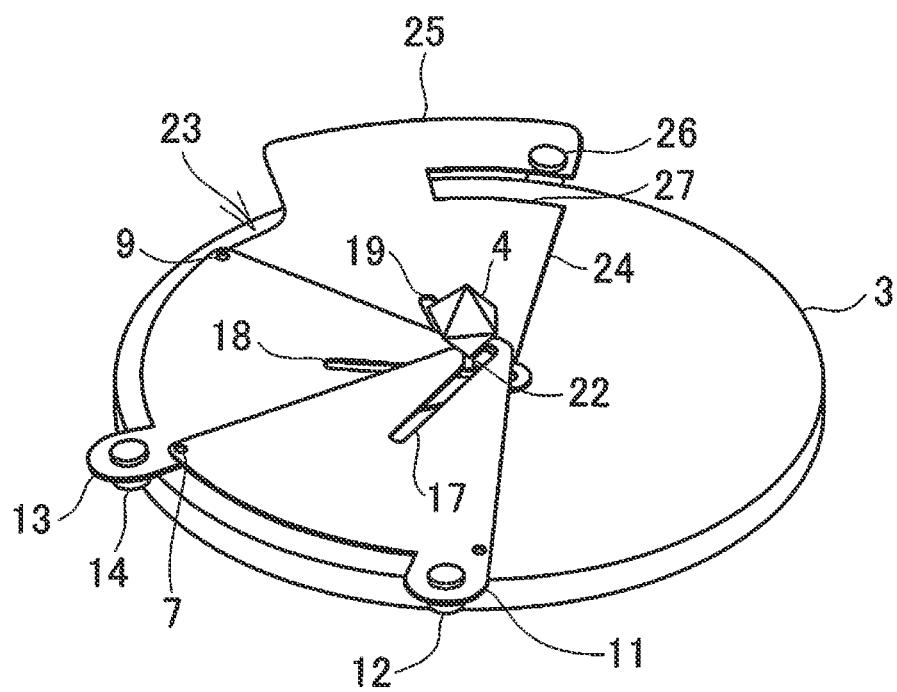
FIG. 4 is a perspective diagram to show a reference point indicating apparatus according to a second embodiment.

Next, by referring to FIG. 4, a description will be given below on a second embodiment of the present invention. It is to be noted that, in FIG. 4, the same components as shown in FIG. 3 are referred by the same symbols, and detailed description thereof will be omitted.

The reference point indicating apparatus 1 (see FIG. 2) in the first embodiment is configured to be put on an object 3 from above. For this reason, each leg portion 12, 14, and 16 could not be viewed from above. Therefore, it is necessary to go around and check whether or not each leg portion 12, 14, and 16 is actually in contact with a peripheral surface of the object 3.

In the reference point indicating apparatus 23 of the second embodiment, a shape of a third link plate 24 located at a far side as seen from a worker is different from that of a third link plate 8 in the first embodiment. The other configuration is the same as that of the first embodiment.

An extending portion 25 extending toward outside is formed in the third link plate 24. The extending portion 25 is formed to leave a part of an outer periphery of the third link plate 24 in FIG. 4. On the other hand, the extending portion 25 may be formed over an entire outer periphery of the third link plate 24.

Further, a third leg portion 26 protruding downward is provided at a peripheral edge of the extending portion 25 at a side different from a second link point 9. Further, an arcuate slit 27 is formed at a center side of the extending portion 25 rather than the third leg portion 26 is provided from a peripheral edge of a side where the third leg portion 26 is provided toward the second link point 9.

A width of the slit 27 has a size enough to visually recognize both of a peripheral edge of the object 3 and the third leg portion 26 when the reference point indicating apparatus 23 is attached to the object 3. Further, a length of the slit 27 is appropriately set as a length enough to easily visually recognize the third leg portion 26 regardless of a worker's viewpoint.

In the second embodiment, it is possible to visually recognize the third leg portion 26 and a periphery of the object 3 from above via the slit 27. Therefore, when the reference point indicating apparatus 23 is attached to the object 3, it is possible to visually check whether or not the third leg portion 26 is in contact with a peripheral surface of the object 3. Accordingly, it is not necessary to go around and check whether or not the third leg portion 26 is in contact with the object 3, and it is possible to improve a workability.

It is to be noted that, in the second embodiment, the slit 27 is formed at the extending portion 25. On the other hand, an observation window made of a transparent resin may be provided instead of the slit 27.

Next, by referring to FIG. 5A, FIG. 5B, FIG. 5C, and FIG. 5D, a description will be given on the third embodiment of the present invention. It is to be noted that, in FIG. 5A, FIG. 5B, FIG. 5C, and FIG. 5D, the same components as shown in FIG. 2A and FIG. 2B are referred by the same symbols, and detailed description thereof will be omitted.

Figure 5A:
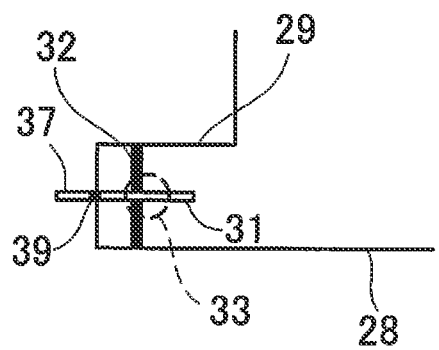
FIG. 5A and FIG. 5B are partial plan drawings to show a reference point indicating apparatus according to a third embodiment.
Figure 5B:
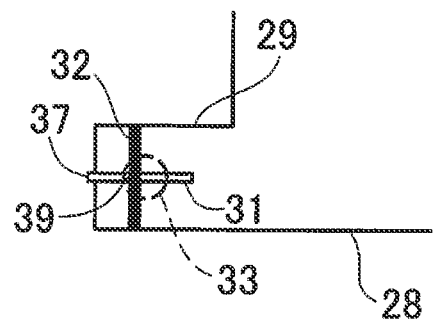
Figure 5C:
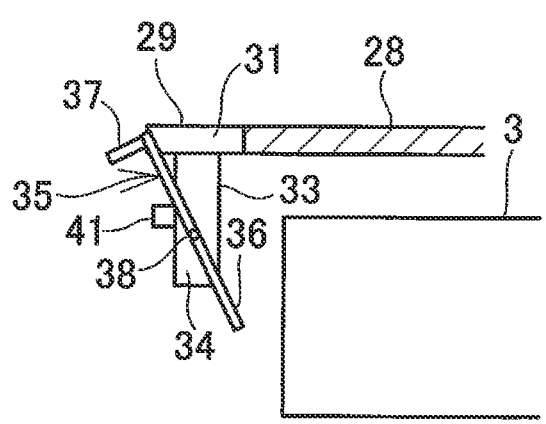
FIG. 5C and FIG. 5D are respectively cross-sectional drawings of FIG. 5A and FIG. 5B.
Figure 5D:
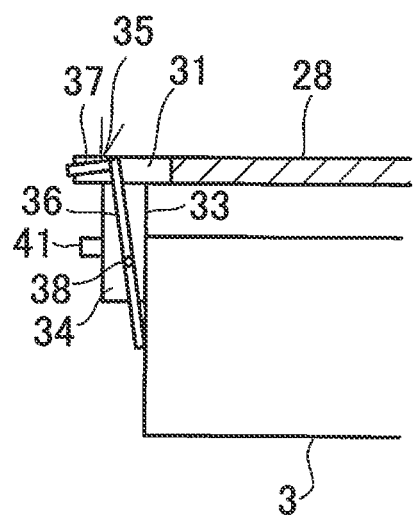

FIG. 5A and FIG. 5B are partial plan drawings to show a first link plate 28 and a first protruded piece 29 in the third embodiment, and FIG. 5C and FIG. 5D are respectively cross-sectional drawings of FIG. 5A and FIG. 5B. It is to be noted that a second link plate (not shown) and a second protruded piece (not shown), and a third link plate (not shown) and a third protruded piece (not shown) have structures respectively similar to the first link plate 28 and the first protruded piece 29. Therefore, description will be given below on the first link plate 28 and the first protruded piece 29.

The first protruded piece 29 has a slit 31 opened to an outer peripheral side, and a linear-shaped fixed marker 32 provided in a direction orthogonal to the slit 31 across the slit 31. Further, a slit 34 continuous with the slit 31 is formed in a first leg portion 33 protruding downward from a lower surface of the first protruded piece 29.

A tilting portion 35 is inserted through the slits 31 and 34. The tilting portion 35 has a shaft portion 36 extending in an up-and-down direction, and a protruded portion 37 protruding from an upper edge of the shaft portion 36 toward an outer peripheral side. The tilting portion 35 is configured to be tiltable centered on a supporting point 38 within the slits 31 and 34 in a contact direction with the object 3, that is, in a direction to get close to or away from a center of the first link plate 28. A linear-shaped movable marker 39 provided in a direction orthogonal to a tilting direction of the tilting portion 35 is provided on an upper surface of the protruded portion 37.

Further, the tilting portion 35 is energized to be rotated in a direction where a lower edge of the shaft portion 36 is close to the object 3 (counterclockwise in FIG. 5C) by an energizing means, such as a spring (not shown). Further, a rotate stopper portion 41 is provided at a predetermined position of the first leg portion 33, and the tilting portion 35 is prevented from rotating beyond a predetermined inclination by the rotate stopper portion 41.

In a state where the tilting portion 35 is restricted from rotating by the rotate stopper portion 41, a lower edge of the shaft portion 36 protrudes from a peripheral surface of the first leg portion 33 toward a center side (the holder 22 side), as shown in FIG. 5A and FIG. 5C. At this time, a position of the fixed marker 32 and a position of the movable marker 39 deviate from each other.

Further, as shown in FIG. 5B, when the first leg portion 33 is in contact with a peripheral surface of the object 3, the shaft portion 36 is pressed by the object 3, and the tilting portion 35 tilts such that a lower end of the shaft portion 36 is flush with a peripheral surface of the first leg portion 33. At this time, a position of the fixed marker 32 and a position of the movable marker 39 coincide with each other and form a straight line shape.

As described above, in third embodiment, the slit 35 is formed in the first protruded piece 29, the tilting portion 35 which tilts within the slit 31 is provided, and when the first leg portion 33 is in contact with a peripheral surface of the object 3, it is configured such that a position of the fixed marker 32 on the first protruded piece 29 and a position of the movable marker 39 on the protruded portion 37 coincide with each other.

Therefore, since a check of contact between the first leg portion 33 and the object 3 is realized merely by check a position of each marker 32 and 39 from above, it does not need to directly check whether or not the first leg portion 33 and the object 3 is in contact with each other, and it is possible to improve a workability.

It is to be noted that, the above description has been given on the first protruded piece 29, the same configuration is applied to a second protruded piece and a third protruded piece. Therefore, it is possible to check a contact state between each leg portion and the object 3 by checking a position of each marker.

Further, in the third embodiment, the tilting portion 35 tilting within the slits 31 and 34 is provided. On the other hand, a contact type sensor for detecting contact with the object 3 may be provided on a peripheral surface of the first leg portion 33.

Figure 6A:
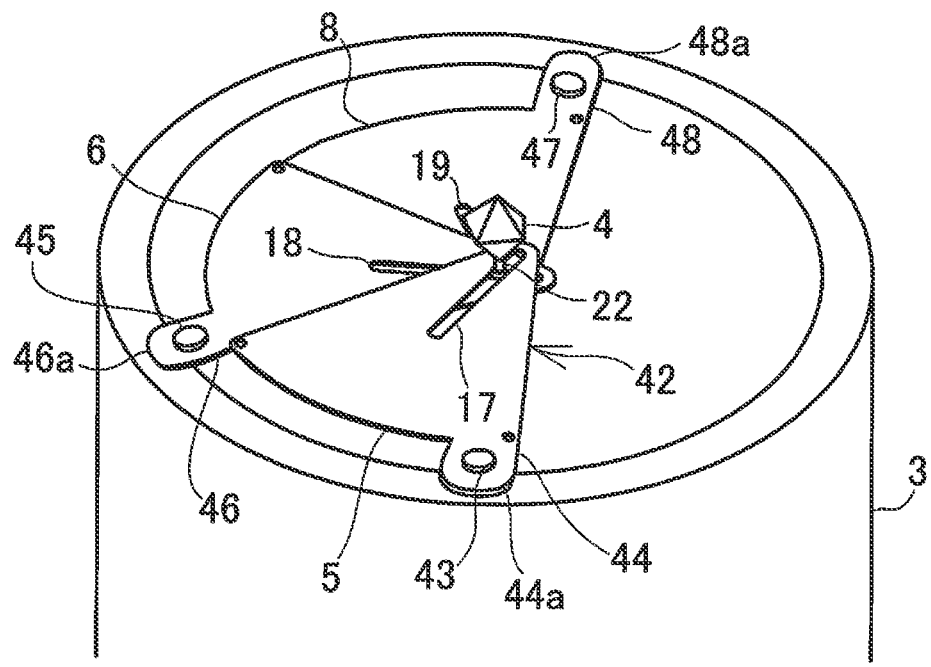
FIG. 6A and FIG. 6B are perspective diagrams to show a reference point indicating apparatus according to a fourth embodiment.
Figure 6B:
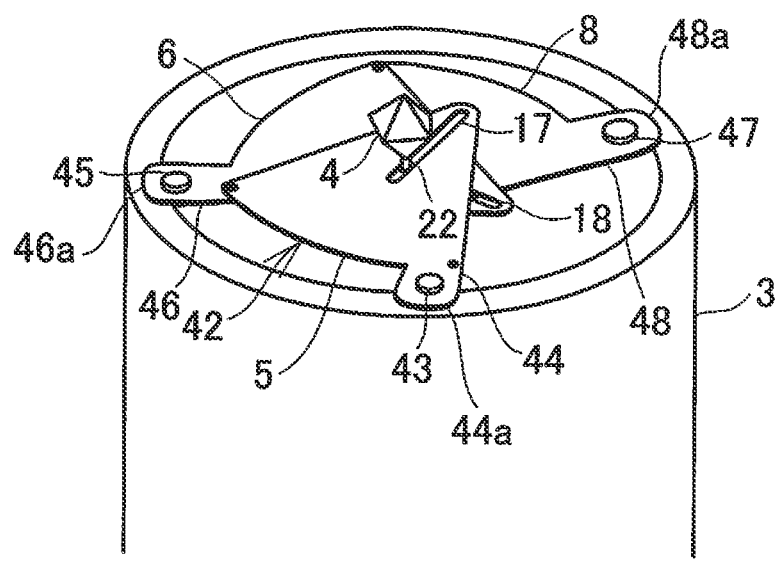

Next, by referring to FIG. 6A and FIG. 6B, a description will be given below on the fourth embodiment of the present invention. It is to be noted that, in FIG. 6A and FIG. 6B, the same components as shown in FIG. 2A and FIG. 2B are referred by the same symbols, and detailed description thereof will be omitted.

In a reference point indicating apparatus 42 in the fourth embodiment, it shows a case where the reference point indicating apparatus 42 is applied to a tubular object 3. A first protruded piece 44 is provided to protrude outside rather than a first leg portion 43 (opposite to a center side), a second protruded piece 46 is provided to protrude outside rather than a second leg portion 45, and a third protruded piece 48 is provided to protrude outside rather than a third leg portion 47. That is, the first protruded piece 44 has a plate-shaped first mounting portion 44a protruding outside from the first leg portion 43, the second protruded piece 46 has a plate-shaped second mounting portion 46a protruding outside from the second leg portion 45, and the third protruded piece 48 has a plate-shaped third mounting portion 48a protruded outside from the third leg portion 47. It is to be noted that it is preferable to provide height adjustment members, such as spacers, respectively on lower surfaces of the first mounting portion 44a and the second mounting portion 46a to be flush (same height) with a lower surface of the third mounting portion 48a.

Further, the reference point indicating apparatus 42 is energized by energizing means, such as a spring, such that a holder 22 slides through each slide slit 17, 18, and 19 toward a fan-shaped center of each link plate 5, 6, and 8, that is, each link plate 5, 6, and 8 rotates in a direction where a circle passing through a center of each leg portion 43, 45, and 47 expands.

Therefore, in a case where the object 3 is tubular, each leg portion 43, 45, and 47 is butted against an inner peripheral surface of the object 3, and the reference point indicating apparatus 42 is attached so that each mounting portion 44a, 46a, and 48a is mounted on an upper surface of the object 3. Thereby, a prism 4 attached to the holder 22 can be automatically moved to a center of a tube without the reference point indicating apparatus 42 falling, and it is possible to indicate a reference point. Further, it is possible to measure a center of a tube, that is, a position of a reference point, by measuring the prism 4.

Next, by referring to FIG. 7A, FIG. 7B, and FIG. 7C, a description will be given below on the fifth embodiment of the present invention. It is to be noted that, in FIG. 7A, FIG. 7B, and FIG. 7C, the same components as shown in FIG. 2A and FIG. 2B are referred by the same symbols, and detailed description thereof will be omitted.

In a reference point indicating apparatus 49 of the fifth embodiment, an indicator is constituted of a base plate 21, a holder 22, an offset bar 51, and a prism 4 as a reference object. The offset bar 51 is provided in the holder 22 via a base edge thereof. The offset bar 51 has a length extending from a center of the reference point indicating apparatus 49 beyond an outer periphery of the reference point indicating apparatus 49. The offset bar 51 has a slit-shaped guide groove 52, and the prism 4 is provided in the guide groove 52 so as to be slidable and to be fixable at arbitrary position.

Figure 7A:
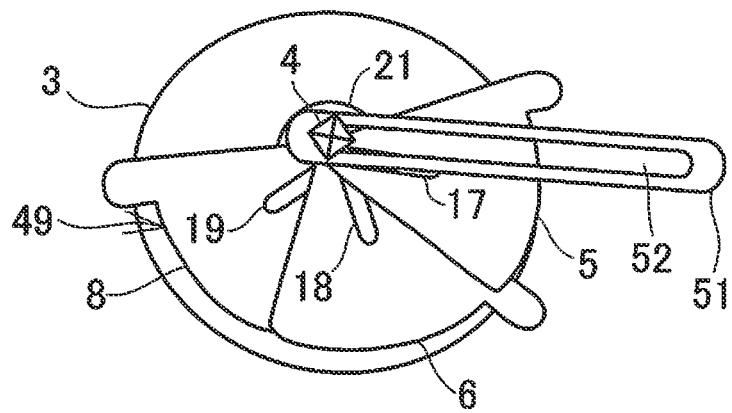
FIG. 7A, FIG. 7B, and FIG. 7C are perspective diagrams to show a reference point indicating apparatus according to a fifth embodiment.

Further, as shown in FIG. 7A when the prism 4 is located at a base edge of the guide groove 52 (center position), the offset bar 51 is configured such that an optical center of the prism 4 and a center of the holder 22 coincide with each other, and is rotatable centered on the holder 22. It is to be noted that when the prism 4 is located at a base edge of the guide groove 52, even if the offset bar 51 is rotated, a position of the prism 4 does not change.

Further, a scale (not shown) is formed on the guide groove 52, and a rotation angle detector (not shown), such as an encoder, is provided on the offset bar 51. Therefore, it is possible to detect an amount of movement from a center of the prism 4 and a rotation angle of the offset bar 51.

In the fifth embodiment, as shown in FIG. 7A, first, the reference point indicating apparatus 49 is attached to the object 3 and the prism 4 is moved to a center position, and then the prism 4 is measured. To be measured at this time is a center of the object 3, that is, a reference point.

Figure 7B:
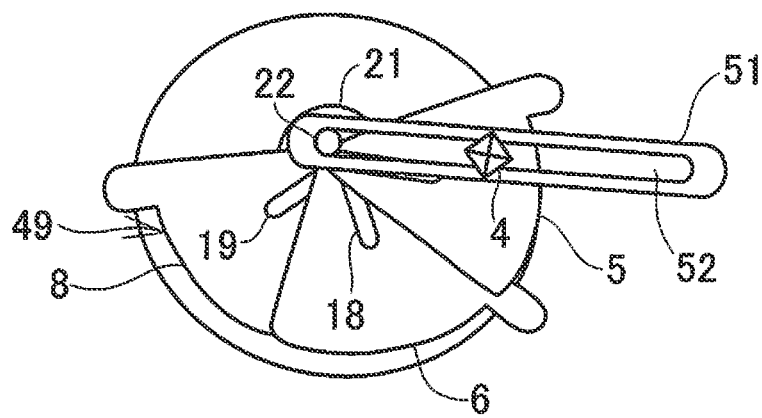
Figure 7C:
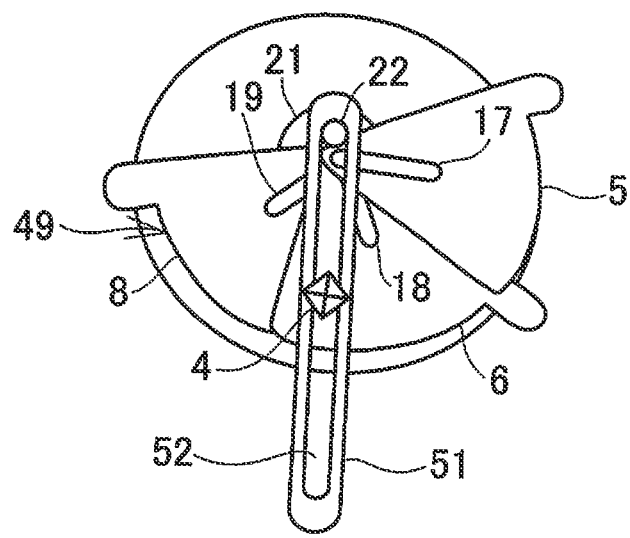

Next, as shown in FIG. 7B, the prism 4 is moved by a desired offset amount along the guide groove 52. Further, as shown in FIG. 7C, the offset bar 51 is rotated by a desired rotation angle, and an offset point is indicated.

By measuring the prism 4 in this state, it is possible to obtain three-dimensional coordinates of an offset point, which is offset by a desired amount in a desired direction from a center of the object 3 (reference point).

Next, by referring to FIG. 8A and FIG. 8B, a description will be given below on a sixth embodiment of the present invention. It is to be noted that, in FIG. 8A and FIG. 8B, the same components as shown in FIG. 2A and FIG. 2B are referred by the same symbols, and detailed description thereof will be omitted.

In the sixth embodiment, a reference point indicating apparatus 53 has two fan-shaped link plates with the same radius as a central angle, such as a 90°.

A first link plate 54 and a second link plate 55 are rotatably linked in an overlapped state at a first link point 56 located at an one peripheral edge of an outer periphery.

Figure 8A:
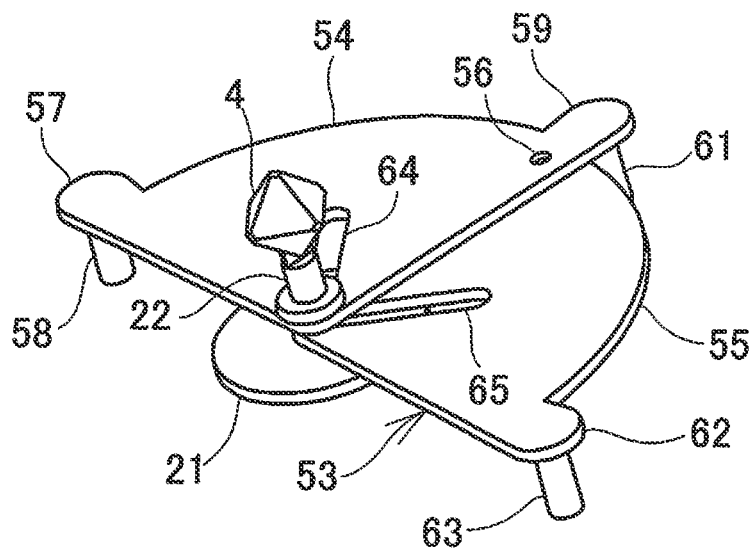
FIG. 8A and FIG. 8B are perspective diagrams to show a reference point indicating apparatus according to a sixth embodiment.
Figure 8B:
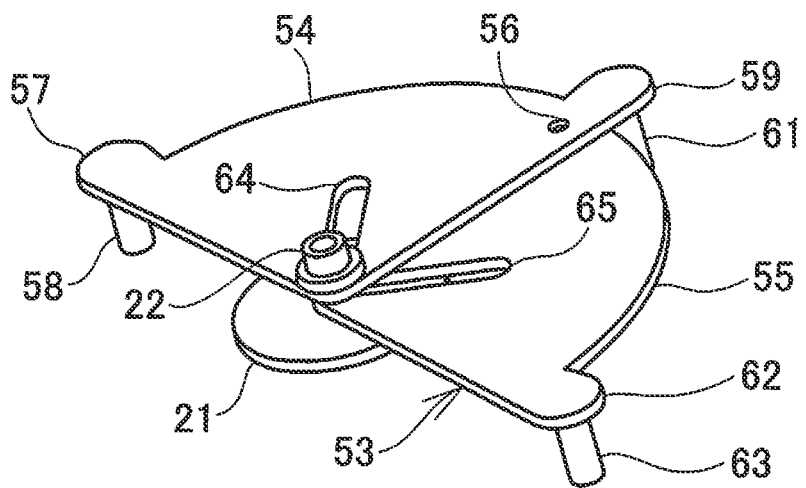

As shown in FIG. 8A and FIG. 8B, a first protruded piece 57 protruding in a radial direction from a fan-shaped arc is provided at a peripheral edge of a side opposite to the first link point 56 of the first link plate 54, and a cylindrical first leg portion 58 protruding downward is provided on a lower surface of the first protruded piece 57. Further, a second protruded piece 59 protruding in a radial direction from a fan-shaped arc is provided at a peripheral edge at a side of the first link point 56 of the first link plate 54, and a cylindrical second leg portion 61 protruding downward is provided on a lower surface of the second protruded piece 59. Further, a third protruded piece 62 protruding in a radial direction from a fan-shaped arc is provided at a peripheral edge of a side opposite to the first link point 56 of the second link plate 55, and a cylindrical third leg portion 63 protruding downward is provided on a lower surface of the third protruded piece 62.

Similar to other embodiments, a slit-shaped first slide slit 64 and a slit-shaped second slide slit 65 are respectively bored in the first link plate 54 and the second link plate 55. A center line extending in a longitudinal direction of the first slide slit 64 is located on a perpendicular bisector of a straight line (chord of a fan-shaped arc) connecting both peripheral edges of the first link plate 54, and a center line extending in a longitudinal direction of the second slide slit 65 is located on a perpendicular bisector of a straight line (chord of a fan-shaped arc) connecting both peripheral edges of the second link plate 55.

A holder 22 and a prism 4 provided on the holder 22 are provided at an intersection of a center line of the first slide slit 64 and a center line of the second slide slit 65. Further, a position of each leg portion 58, 61, and 63 is set such that an intersection of a perpendicular bisector of a straight line connecting a center of the first leg portion 58 and a center of the second leg portion 61, and a perpendicular bisector of a straight line connecting a center of the second leg portion 61 and a center of the third leg portion 63 coincides with an optical center of the prism 4. That is, a center of each leg portion 58, 61, and 63 is located on the same circumference centered on the prism 4.

Also in the sixth embodiment, the reference point indicating apparatus 53 is capable of changing a size of a circle passing through a center of each leg portion 58, 61, and 63 by sliding the holder 22, and even in a case where a size of a circle is changed, the prism 4 is always located at a center of the circle.

Therefore, regardless of a diameter of an object 3 (see FIG. 2), merely by rotating each link plate 54 and 55 such that each leg portion 58, 61, and 63 is in contact with a peripheral surface of the object 3, it is possible to automatically move the prism 4 on a center of the object 3, and to indicate a reference point.

Figure 9:
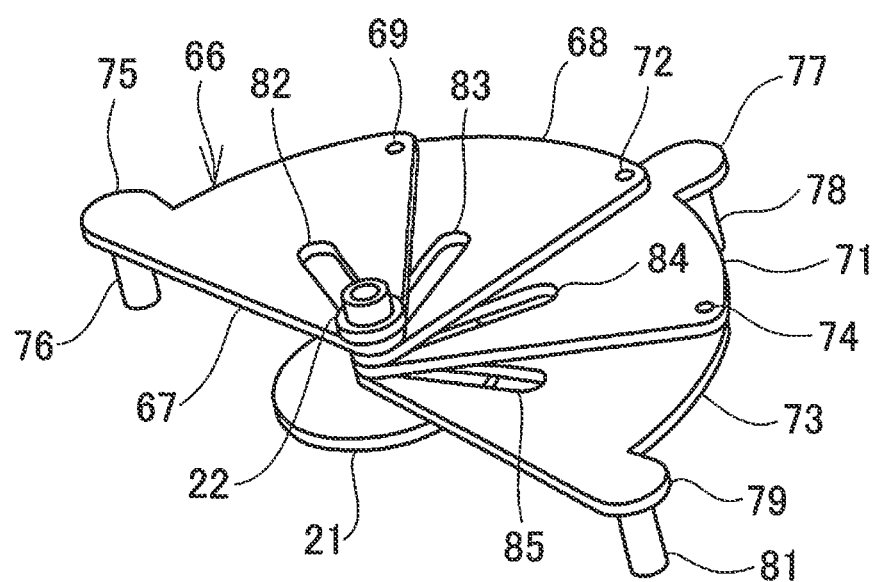
FIG. 9 is a perspective diagram to show a reference point indicating apparatus according to a seventh embodiment.

Next, by referring to FIG. 9, a description will be given below on a seventh embodiment of the present invention. It is to be noted that, in FIG. 9, the same components as shown in FIG. 2 are referred by the same symbols, and detailed description thereof will be omitted.

In the seventh embodiment, a reference point indicating apparatus 66 has four fan-shaped link plates with the same radius as a central angle, such as a 45°.

A first link plate 67 and a second link plate 68 are rotatably linked in an overlapped state at a first link point 69 located at a one peripheral edge of an outer periphery. Further, the second link plate 68 and the third link plate 71 are rotatably linked in an overlapped state at a second link point 72 located at a peripheral edge at a side opposite to the first link point 69 of the second link plate 68. Further, the third link plate 71 and the fourth link plate 73 are rotatably linked in an overlapped state at a third link point 74 located at a peripheral edge at a side opposite to the second link point 72 of the third link plate 71.

It is to be noted that, in the reference point indicating apparatus 66, each link plate 67, 68, 71, and 73 is linked such that mutual overlapping is not be prevented. For instance, as shown in FIG. 9, the second link plate 68 is located below the first link plate 67, the third link plate 71 is located below the second link plate 68, and the fourth link plate 73 is located below the third link plate 71.

A first protruded piece 75 protruding in a radial direction from a fan-shaped arc is provided at a peripheral edge of a side opposite to the first link point 69 of the first link plate 67, and a cylindrical first leg portion 76 protruding downward is provided on a lower surface of the first protruded piece 75. Further, a second protruded piece 77 protruding in a radial direction from a fan-shaped arc is provided at a peripheral edge at a side of the second link point 72 of the third link plate 71, and a cylindrical second leg portion 78 protruding downward is provided on a lower surface of the second protruded piece 77. Further, a third protruded piece 79 protruding in a radial direction from a fan-shaped arc is provided at a peripheral edge of a side opposite to the third link point 74 of the fourth link plate 73, and a cylindrical third leg portion 81 protruding downward is provided on a lower surface of the third protruded piece 79.

Similar to other embodiments, a slit-shaped first slide slit 82 is bored in the first link plate 67, a slit-shaped second slide slit 83 is bored in the second link plate 68, a slit-shaped third slide slit 84 is bored in the third link plate 71, and a slit-shaped fourth slide slit 85 is bored in the fourth link plate 73.

A center line in a longitudinal direction of each slide slit 82, 83, 84, and 85 is located on a perpendicular bisector of a straight line connecting both peripheral edges of each link plate 67, 68, 71, and 73. Further, a holder 22 and a prism 4 (see FIG. 2) are provided at an intersection of a center line of each slide slit 82, 83, 84, and 85.

It is to be noted that a perpendicular bisector of a straight line connecting the first link point 69 and the second link point 72 coincides with a center line of the second slide slit 83, and a perpendicular bisector of a straight line connecting the second link point 72 and the third link point 74 coincides with a center line of the third slide slit 84. That is, each link point 69, 72, and 74 is located on the same circumference centered on the prism 4 regardless of a position of the prism 4.

Further, a position of each leg portion 76, 78, and 81 is set such that an optical center of the prism 4 is located on an intersection of a perpendicular bisector of a straight line connecting a center of the first leg portion 76 and a center of the second leg portion 78 and a perpendicular bisector of a straight line connecting a center of the second leg portion 78 and a center of the third leg portion 81. That is, a center of each leg portion 76, 78, and 81 is located on the same circumference centered on the prism 4, and the circle has a relationship of being a concentric circle with a circle passing through each link point 69, 72, and 74 centered on the prism 4.

Also in the seventh embodiment, the reference point indicating apparatus 66 is capable of changing a size of a circle passing through a shaft center of each leg portion 76, 78, and 81 by sliding the holder 22. Further, even in a case where a size of a circle is changed, the prism 4 is always located at a center of the circle.

Therefore, regardless of a diameter of an object 3 (see FIG. 2), merely by rotating each link plate 67, 68, 71, and 73 such that each leg portion 76, 78, and 81 is in contact with a peripheral surface of the object 3, it is possible to automatically move the prism 4 on a center of the object 3, and to indicate a reference point.

It is to be noted that reference point indicating apparatuses are configure such that two link plates are used in the sixth embodiment and four link plates are used in the seventh embodiment. On the other hand, a reference point indicating apparatus may be configured to use five or more link plates.

Further, in the first to seventh embodiments, positions of each leg portion and each link point are set to have a relationship of being a concentric circle centered on the prism 4, but it is not limited to this relationship. For instance, each leg portion may be provided so as to be concentric with each link point, and each leg portion and each link point may be located on the same circumference centered on the prism 4.

Further, needless to say, in the first to seventh embodiments, although three leg portions are provided in the reference point indicating apparatus, if being located on a concentric circle or the same circumference with a circle passing through each link point centered on the prism 4, four or more leg portions may be provided in the reference point indicating apparatus.

Next, by referring to FIG. 10A and FIG. 10B, a description will be given below on an eighth embodiment of the present invention. It is to be noted that, in FIG. 10A and FIG. 10B, the same components as shown in FIG. 2A and FIG. 2B are referred by the same symbols, and detailed description thereof will be omitted.

In the eighth embodiment, a reference point indicating apparatus 86 has two T-shaped link plates. A first link plate 87 has a first shaft portion 88 and a first slide portion 89 perpendicular to the first shaft portion 88. A second link plate 91 has a second shaft portion 92 and a second slide portion 93 perpendicular to the second shaft portion 92. It is to be noted that an outside shape of each shaft portion 88 and 92 and an outside shape of each sliding part 89 and 93 are substantially linear.

The first link plate 87 and the second link plate 91 are rotatably linked in an overlapped state at a first link point 94 located in one end of the first shaft portion 88 and the second shaft portion 92.

Figure 10A:
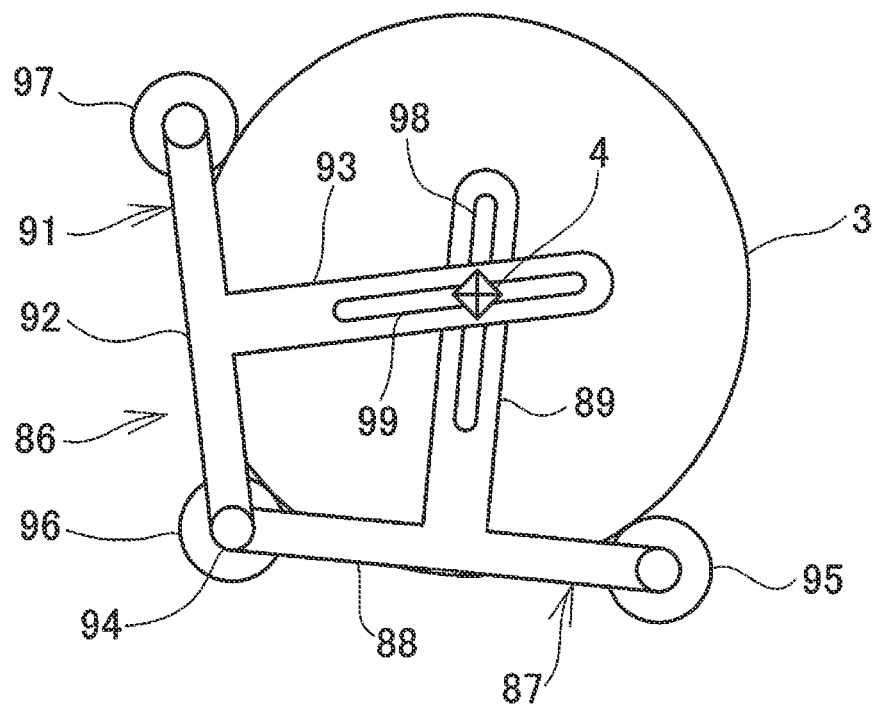
FIG. 10A and FIG. 10B are perspective diagrams to show a reference point indicating apparatus according to an eighth embodiment.
Figure 10B:
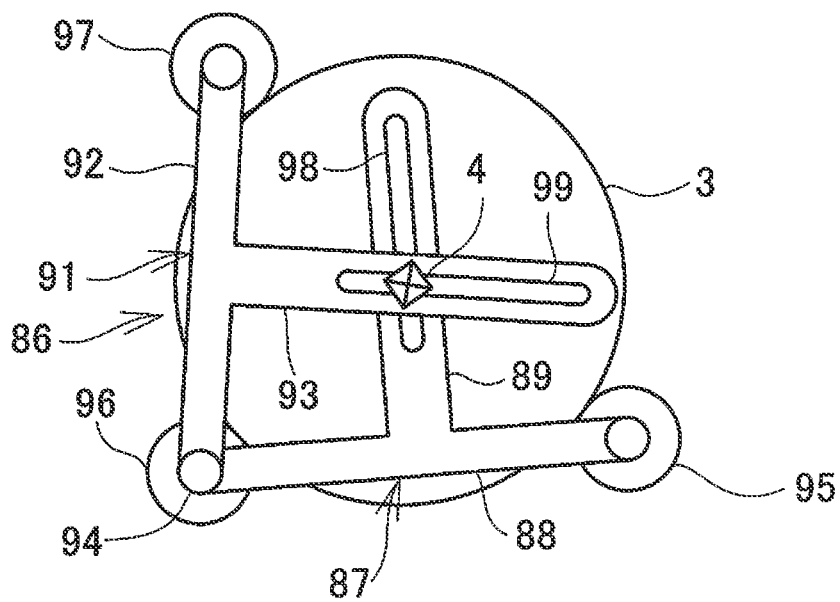

As shown in FIG. 10A and FIG. 10B, a cylindrical first leg portion 95 protruding downward is provided at an edge portion at a side opposite to the first link point 94 of the first shaft portion 88. Further, a second leg portion 96 protruding downward is provided at an edge portion at a side of the first link point 94 between the first shaft portion 88 and the second shaft portion 92 so as to be concentric with the first link point 94. Further, a cylindrical third leg portion 97 protruding downward is provided at an edge portion at a side opposite to the first link point 94 of the second shaft portion 92. The first leg portion 95, the second leg portion 96, and the third leg portion 97 are cylinders having the same radius.

A slit-shaped first slide slit 98 is bored in the first slide portion 89, and a slit-shaped second slide slit 99 is bored in the second slide portion 93. A center line extending in a longitudinal direction of the first slide slit 98 is located on a perpendicular bisector of a straight line connecting a center of the first leg portion 95 and a center of the second leg portion 96, and a center line extending in a longitudinal direction of the second slide slit 99 is located on a perpendicular bisector of a straight line connecting a center of the second leg portion 96 and a center of the third leg portion 97.

Further, a holder 22 (see FIG. 2) and a prism 4 provided on the holder 22 are provided on an intersection of a center line of the first slide slit 98 and a center line of the second slide slit 99. That is, the prism 4 is located on an intersection of a perpendicular bisector of a straight line connecting a center of the first leg portion 95 and a center of the second leg portion 96, and a perpendicular bisector of a straight line connecting a center of the second leg portion 96 and a center of the third leg portion 97.

For this reason, even if the prism 4 moves along the first slide slit 98 and the second slide slit 99, a center of each leg portion 95, 96, and 97 is always located on the same circumference centered on the prism 4 (centered on the intersection).

Also in the eighth embodiment, the reference point indicating apparatus 86 is capable of changing a size of a circle passing through each leg portion 95, 96, and 97 by sliding the prism 4 (the holder 22). Further, even in a case where a size of the circle is changed, a center of each leg portion 95, 96, and 97 is located on the same circumference centered on the prism 4.

Therefore, regardless of a diameter of an object 3, merely by rotating each link plate 87 and 91 such that each leg portion 95, 96, and 97 is in contact with a peripheral surface of the object 3, it is possible to automatically move the prism 4 on a center of the object 3, and to indicate a reference point.

Figure 11:
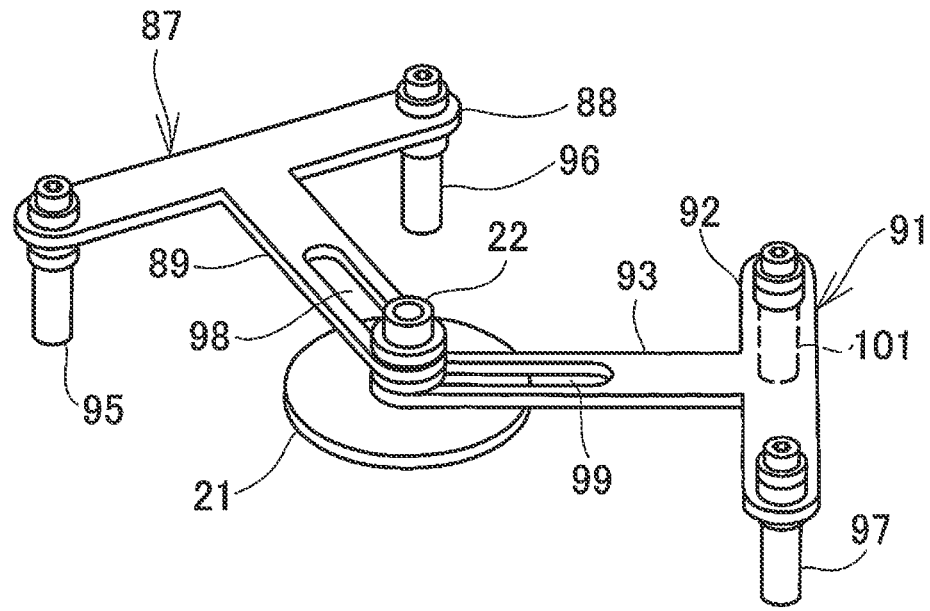
FIG. 11 is a perspective diagram to show a reference point indicating apparatus according to a first modified embodiment of the eighth embodiment.

FIG. 11 shows a first modified embodiment of the eighth embodiment. In the first modified embodiment, the first link plate 87 and the second link plate 91 are not linked via the first shaft portion 88 and the second shaft portion 92.

Further, the first leg portion 95 and the second leg portion 96 which protrude downward are respectively provided at both ends of the first shaft portion 88, and the third leg portion 97 and a fourth leg portion 101 which protrude downward are respectively provided at both ends of the second shaft portion 92.

In the first modified embodiment, the holder 22 is slid within the first slide slit 98 and the second slide slit 99 in such a manner that the first leg portion 95 and the second leg portion 96 are in contact with a peripheral surface of the object 3 and the third leg portion 97 and the fourth leg portion 101 are also in contact with a peripheral surface of the object 3.

At this time, a circle passing through a center of each leg portion 95, 96, 97, and 101 and the object 3 have a relationship of being a concentric circle, and the holder 22 and the prism 4 provided on the holder 22 are located on an intersection of a perpendicular bisector of a straight line connecting a center of the first leg portion 95 and a center of the second leg portion 96, and a perpendicular bisector of a straight line connecting a center of the third leg portion 97 and a center of the fourth leg portion 101. That is, the prism 4 is located on a center of the object 3.

Therefore, regardless of a diameter of the object 3, merely by sliding each link plate 87 and 91 such that each leg portion 95, 96, 97, and 101 is in contact with a peripheral surface of the object 3, it is possible to automatically move the prism 4 on a center of the object 3, and to indicate a reference point.

Figure 12:
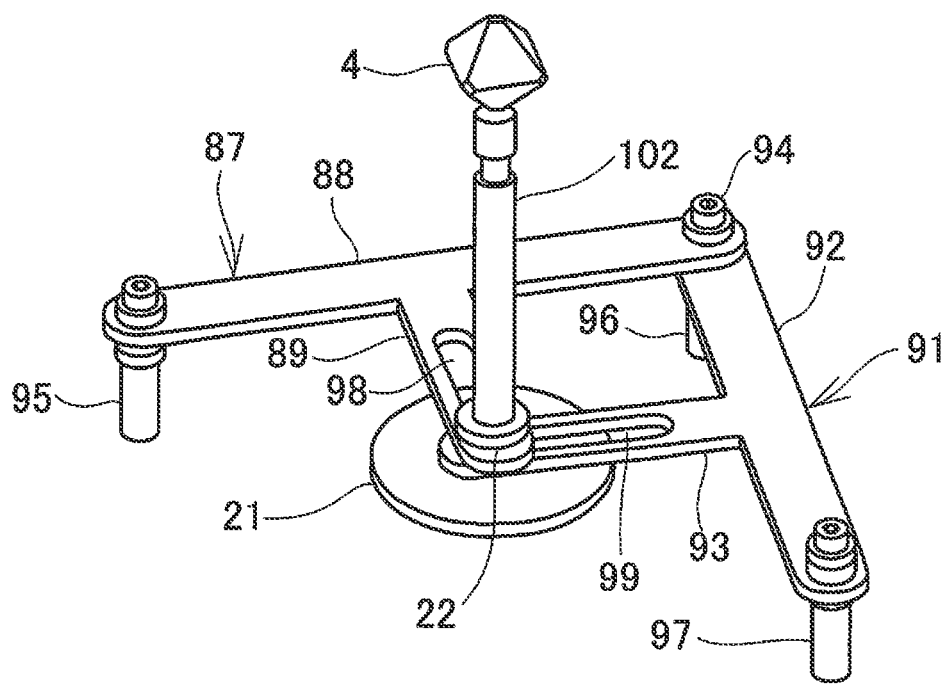
FIG. 12 is a perspective diagram to show a reference point indicating apparatus according to a second modified embodiment of the eighth embodiment.

FIG. 12 shows a second modified embodiment of the eighth embodiment. In the second modified embodiment, an expander 102 is attached to the holder 22, and the prism 4 is attached to the expander 102. That is, an indicator is constituted of a base plate 21, the holder 22, the expander 102, and the prism 4.

The expander 102 is expandable and contractable in an up-and-down direction, that is, in a direction orthogonal to a surface of the object 3. Further, a scale or the like is provided on the expander 102 and it is possible to detect an amount of expansion and contraction.

Therefore, it is possible to become already known a height from a lower surface of the base plate 21 to an optical center of the prism 4, and to obtain three-dimensional coordinates of arbitrary height from a surface of the object 3.

It is to be noted that, needless to say, the expander 102 and the prism 4 attached to the expander 102 in the second modified embodiment are applicable also to other embodiments.

Figure 13:
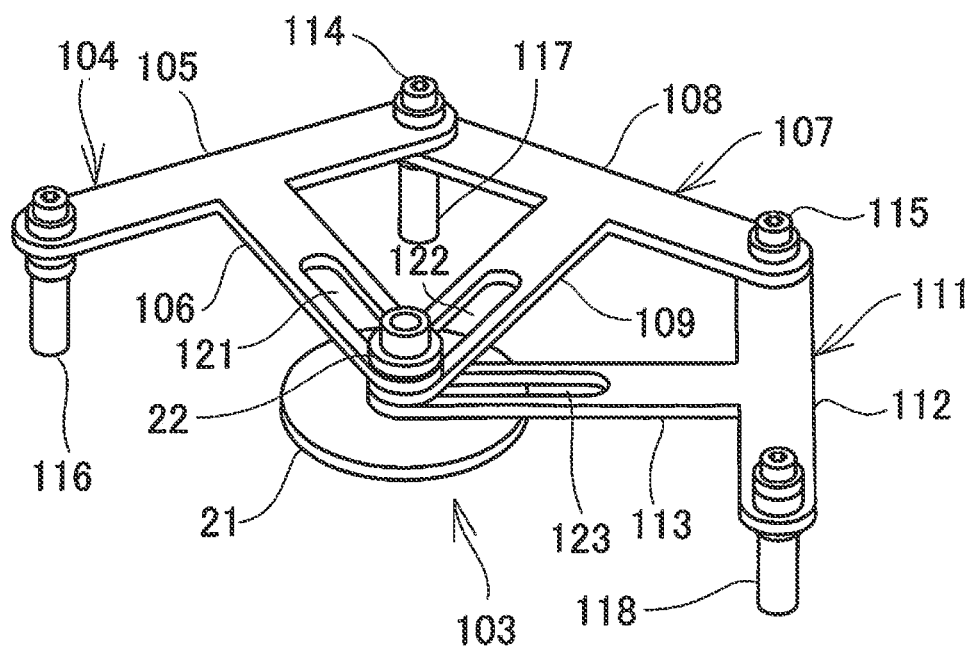
FIG. 13 is a perspective diagram to show a reference point indicating apparatus according to a ninth embodiment.

Next, by referring to FIG. 13, a description will be given below on a ninth embodiment of the present invention. It is to be noted that, in FIG. 13, the same components as shown in FIG. 10A and FIG. 10B are referred by the same symbols, and detailed description thereof will be omitted.

In the ninth embodiment, a reference point indicating apparatus 103 has three T-shaped link plates. A first link plate 104 has a first shaft portion 105 and a first slide portion 106, a second link plate 107 has a second shaft portion 108 and a second slide portion 109, and a third link plate 111 has a third shaft portion 112 and a third slide portion 113.

The first link plate 104 and the second link plate 107 are rotatably linked in an overlapped state at a first link point 114 located in one end of the first shaft portion 105 and the second shaft portion 108. Further, the second link plate 107 and the third link plate 111 are rotatably linked in an overlapped state at a second link point 115 located in the other end of the second shaft portion 108 and one end of the third shaft portion 112. It is to be noted that each link plate 104, 107, and 111 is arranged not to prevent mutual rotating. For instance, the first link plate 104 is linked with an upper surface of the second link plate 107, and the third link plate 111 is linked with a lower surface of the second link plate 107.

A cylindrical first leg portion 116 protruding downward is provided at the other end of the first shaft portion 105. Further, a cylindrical second leg portion 117 protruding downward is provided at an edge portion at a side of the first link point 114 of the second shaft portion 108 so as to be concentric with the first link point 114. Further, a cylindrical third leg portion 118 protruding downward is provided at an edge portion at a side opposite to the second link point 115 of the third shaft portion 112.

A slit-shaped first slide slit 121 is bored in the first slide portion 106, a slit-shaped second slide slit 122 is bored in the second slide portion 109, and a slit-shaped third slide slit 123 is bored in the third slide portion 113.

A center line extending in a longitudinal direction of the first slide slit 121 is located on a perpendicular bisector of a straight line connecting a center of the first leg portion 116 and a center of the second leg portion 117 (the first link point 114), a center line extending in a longitudinal direction of the second slide slit 122 is located on a perpendicular bisector of a straight line connecting a center of the second leg portion 117 (the first link point 114) and a center of the second link point 115, and a center line extending in a longitudinal direction of a third slide slit 123 is located on a perpendicular bisector of a straight line connecting a center of the second link point 115 and a center of the third leg portion 118.

Further, a holder 22 and a prism 4 (see FIG. 10) attached to the holder 22 are provided on an intersection of a center line of the first slide slit 121, a center line of the second slide slit 122, and a center line of the third slide slit 123. That is, the prism 4 is located on an intersection of a perpendicular bisector of a straight line connecting a center of the first leg portion 116 and a center of the second leg portion 117 (the first link point 114), a perpendicular bisector of a straight line connecting a center of the second leg portion 117 (the first link point 114) and a center of the second link point 115, and a perpendicular bisector of a straight line connecting a center of the second link point 115 and a center of the third leg portion 118.

For this reason, even in a case where the prism 4 moves along each slide slit 121, 122, and 123, the prism 4 is always located at a center of a circle passing through a center of each leg portion 116, 117, 118 and a center of each link point 114 and 115.

Also in the ninth embodiment, even in a case where the reference point indicating apparatus 103 changes a size of a circle passing through each leg portion 116, 117, and 118 and each link point 114 and 115 by sliding the prism 4, each leg portion 116, 117 and 118, and each link plate 114 and 115 are located on the same circumference centered on the prism 4.

Therefore, regardless of a diameter of the object 3, merely by rotating each link plate 104, 107, and 111 such that each leg portion 116, 117, and 118 is in contact with a peripheral surface of the object 3, it is possible to automatically move the prism 4 on a center of the object 3, and to indicate a reference point.

It is noted that, in the ninth embodiment, although three leg portions are provided in the reference point indicating apparatus 103, the number of leg portions may be four by providing a leg portion concentric with the second link point 115.

Figure 14:
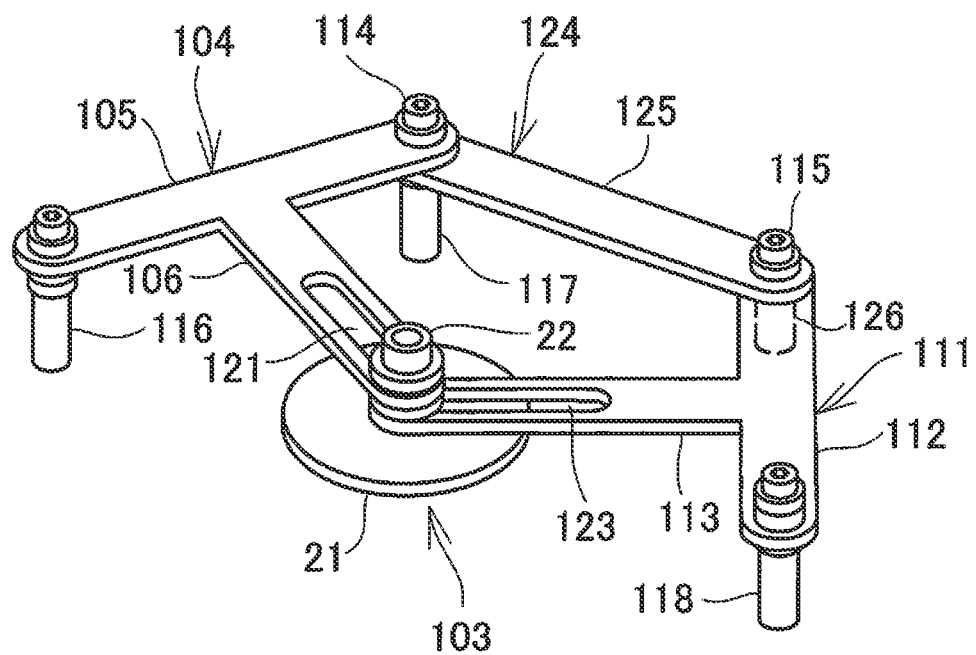
FIG. 14 is a perspective diagram to show a reference point indicating apparatus according to a modified embodiment of the ninth embodiment.

FIG. 14 shows a modified embodiment of the ninth embodiment. In the modified embodiment, a second link plate 124 have no second slide portion, and is constituted only a second shaft portion 125. Further, a cylindrical fourth leg portion 126 protruding downward is provided at an edge portion at a side of the second link point 115 of the third link plate 111 so as to be concentric with the second link point 115.

In the above-described modified embodiment, the holder 22 is slid within the first slide slit 121 and the third slide slit 123 in such a manner that the first leg portion 116 and the second leg portion 117 are in contact with a peripheral surface of the object 3 and the third leg portion 118 and the fourth leg portion 126 are also in contact with a peripheral surface of the object 3.

At this time, a circle passing through a center of each leg portion 116, 117, 118, and 126 and the object 3 have a relationship of being a concentric circle, and the holder 22 and the prism 4 are located on an intersection of a perpendicular bisector of a straight line connecting a center of the first leg portion 116 and a center of the second leg portion 117, and a perpendicular bisector of a straight line connecting a center of the third leg portion 118 and a center of the fourth leg portion 126. That is, the prism 4 is located on a center of the object 3.

Therefore, regardless of a diameter of the object 3, merely by rotating each link plate 104, 107, and 111 such that each leg portion 116, 117, 118, and 126 is in contact with a peripheral surface of the object 3, it is possible to automatically move the prism 4 on a center of the object 3, and to indicate a reference point.

Figure 15A:
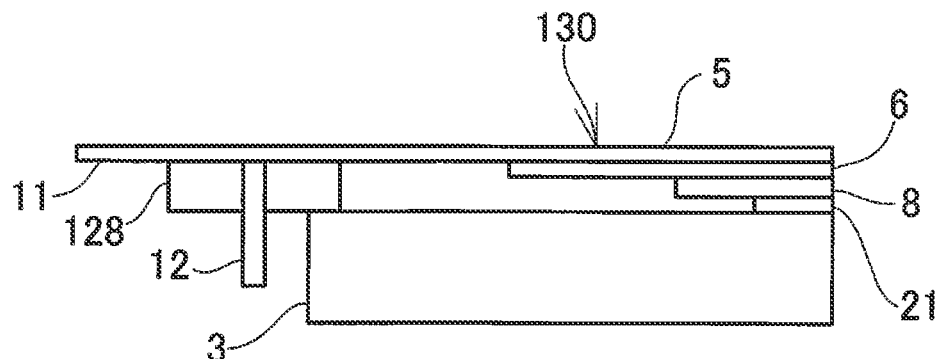
FIG. 15A is a partial cross-sectional drawing to show a reference point indicating apparatus according to a tenth embodiment.

Next, by referring to FIG. 15A, a description will be given below on a tenth embodiment of the present invention. It is to be noted that, in FIG. 15A, the same components as shown in FIG. 2A and FIG. 2B are referred by the same symbols, and detailed description thereof will be omitted. Further, FIG. 15A describes a first link plate 5.

In particular, in a case where a reference point indicating apparatus 130 is upsized, the first link plate 5 may bend downward due to a self-weight of the first link plate 5, or due to a weight of a first leg portion 12. Since a contact position between an object 3 and the first leg portion 12 changes in a case where the first link plate 5 bends, there may be a possibility that a positional displacement may occur between a center of the object 3 and an indicator.

In the tenth embodiment, a height adjustment member 128, such as a spacer, is provided around the first leg portion 12 or adjacent to the first leg portion 12. The height adjustment member 128 is, for instance, cylindrical, and a lower surface of the height adjustment member 128 is configured to be located on the same plane as a lower surface of a base plate 21 (indicator). That is, when the reference point indicating apparatus 130 is attached to the object 3, a lower surface of the indicator and a lower surface of the height adjustment member 128 are in contact with an upper surface of the object 3 on the same plane.

By attaching the reference point indicating apparatus 130 to the object 3 in such a manner that a lower surface of the height adjustment member 128 contacts with an upper surface of the object 3, it is possible to contact a peripheral surface of the first leg portion 12 with a peripheral surface of the object 3 without bending the first link plate 5. Therefore, it is possible to prevent a positional displacement which occurs between a center of the object 3 and the indicator (the base plate 21) and to improve measurement accuracy of a center (a reference point) of the object 3.

It is to be noted that, in the above description, the first link plate 5 has been described, but a height adjustment member for preventing bending is also provided on a second link plate 6 and a third link plate 8 similarly to the first link plate 5.

Figure 15B:
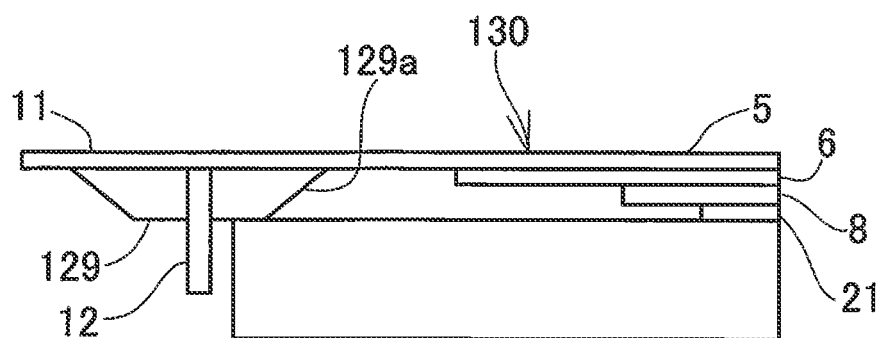
FIG. 15B is a partial cross-sectional drawing to show a reference point indicating apparatus according to a modified embodiment of the tenth embodiment.

FIG. 15B shows a modified embodiment of the tenth embodiment. The height adjustment member 128 is cylindrical in the tenth embodiment. However, in a case where the height adjustment member 128 is cylindrical, there is a possibility of mistaking a contact between a peripheral surface of the height adjustment member 128 and a peripheral surface of the object 3 for a contact between a peripheral surface of the first leg portion 12 and a peripheral surface of the object 3.

In the modified embodiment of tenth embodiment, the height adjustment member 129 has, for instance, a frustum shape with a downward contracting diameter. That is, a periphery of the height adjustment member 129 is a slope-shaped guide portion 129a having a thickness gradually increasing toward a center from an outer peripheral side of the frustum of a cone. That is, a thickness of the guide portion 129a gradually increases toward an outer peripheral side from a center side of the reference point indicating apparatus 130.

When a periphery of the height adjustment member 129, that is, the guide portion 129a is in contact with a periphery (corner portion) of the object 3, since the corner portion of the object 3 slides and is guided in the guide portion 129a, movement (rotating) of the first link plate 5 is not prevented until a peripheral surface of the first leg portion 12 and a peripheral surface of the object 3 are in contact with each other. Therefore, it is possible to prevent from mistaking a contact between a peripheral surface of the height adjustment member 129 and a peripheral surface of the object 3 for a contact between a peripheral surface of the first leg portion 12 and a peripheral surface of the object 3, and to improve an installation workability of the reference point indicating apparatus 130 and improve measurement accuracy of a center of the object 3.

Figure 15C:
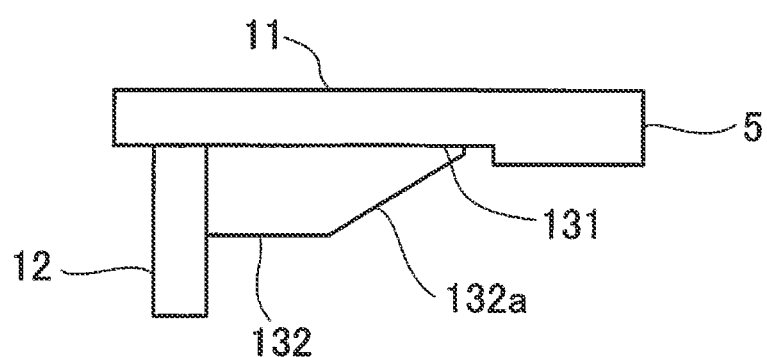
FIG. 15C and FIG. 15D are partial cross-sectional drawings to show a modified embodiment of a height adjustment member.
Figure 15D:
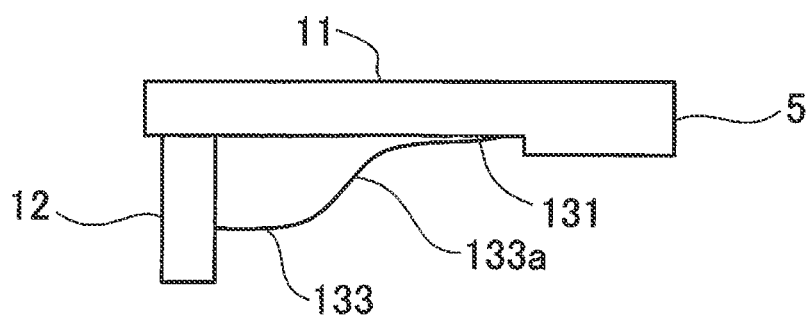

It is to be noted that, as shown in FIG. 15C, a recess portion 131 may be formed on a back surface of a first protruded piece 11 and a height adjustment member 132 may be provided on the recess portion 131. The height adjustment member 132 has a slope-shaped guide portion 132a formed only in a direction parallel to a straight line connecting a center of the first leg portion 12 and a center of the indicator (the base plate 21). That is, a thickness of the guide portion 132a gradually increases toward an outer peripheral side from a center side of the reference point indicating apparatus 130. Since the object 3 is reliably in contact with the guide portion 132a without sharpening a tip of the guide portion 132a by providing the height adjustment member 132 on the recess portion 131, it is possible to easily process the guide portion 132a. Alternatively, as shown in FIG. 15D, a height adjustment member 133 having a guide portion 133a which has a bent curved surface may be used. Similar to the guide portion 132a, a thickness of the guide portion 133a also gradually increases toward an outer peripheral side from a center side of the reference point indicating apparatus 130.

In the tenth embodiment and the modified embodiment thereof, a case where a height adjustment member is provided on the first link plate 5 according to the first embodiment has been described. On the other hand, needless to say, a height adjustment member of the present embodiment may be provided on a link plate of other embodiments.

Further, needless to say that it is possible to combine the first to tenth embodiments and modified embodiments with one another as appropriate.

The invention claimed is:

1. A reference point indicating apparatus comprising: at least two link plates, a slide slit formed in each link plate, an indicator configured to be slidable along each slide slit and to be provided at an intersection of a center line of each slide slit, and at least three leg portions configured to be provided on the same circumference centered on said indicator, wherein said indicator is configured to be located on an intersection of a perpendicular bisector of each straight line connecting centers of leg portions adjacent to each other, said leg portions are configured to be contactable with an object by sliding said indicator, said indicator is configured to indicate a reference point of said object in a state where each leg portion is in contact with said object.

2. The reference point indicating apparatus according to claim 1, wherein said link plate is configured to be a fan shape with a predetermined central angle and to be rotatably linked via a link point with one peripheral edge of an adjacent link plate, wherein said center line of said slide slit is configured to be located on a perpendicular bisector of a straight line connecting both peripheral edges of said link plate.

3. The reference point indicating apparatus according to claim 1, wherein said link plate is configured to be T-shape, and to have a shaft portion for being rotatably linked with an adjacent link plate, and a slide portion in which said slide slit is formed, wherein said center line of said slide slit is configured to be located on a perpendicular bisector of said shaft portion.

4. The reference point indicating apparatus according to claim 2, wherein a circle passing through said link point centered on said indicator and a circle passing through said leg portion centered on said indicator are configured to become the same circle or a concentric circle.

5. The reference point indicating apparatus according to claim 2, wherein a slit to be capable of visually recognizing a contact between said leg portion and said object is formed in said link plate.

6. The reference point indicating apparatus according to claim 2, further comprising said leg portion having a tilting portion which is tiltable in a contact direction with respect said object, a fixed marker is configured to be provided on said link plate, and a movable marker is configured to be provided in a upper surface of said tilting portion, wherein said tilting portion is configured to be energized such that a lower edge protrudes in a direction of said indicator from said leg portion, wherein said leg portion and a lower edge of said tilting portion are flush by being contacted with said object, and said fixed marker and said movable marker coincide with each other.

7. The reference point indicating apparatus according to claim 1, wherein said indicator includes a holder, an offset bar rotatably provided centered on said holder and bored a guide groove, and a reference object slidably provided along said guide groove, wherein said reference object is configured to be capable of indicating an offset point which is offset in a predetermined direction with respect to a reference point by a predetermined distance.

8. The reference point indicating apparatus according to claim 1, wherein an energizing means is configured to energize a circle centered on said indicator and passing through each leg portion in a direction of expansion or contraction is provided.

9. The reference point indicating apparatus according to claim 1, wherein said indicator is configured to include a retro-reflector or a transfer tool.

10. The reference point indicating apparatus according to claim 9, wherein said indicator is configured to include a prism attached via an expander capable of being expanded and contracted in an up-and-down direction.

11. The reference point indicating apparatus according to claim 1, wherein a height adjustment member is provided to be adjacent each leg portion, wherein a lower surface of said height adjustment member is configured to be located on the same plane as a lower surface of said indicator.

12. The reference point indicating apparatus according to claim 11, wherein said height adjustment member includes a guide portion having a thickness gradually increasing from a center side toward an outer peripheral side.

13. The reference point indicating apparatus according to claim 3, wherein a circle passing through said link point centered on said indicator and a circle passing through said leg portion centered on said indicator are configured to become the same circle or a concentric circle.

14. The reference point indicating apparatus according to claim 3, wherein a slit to be capable of visually recognizing a contact between said leg portion and said object is formed in said link plate.

15. The reference point indicating apparatus according to claim 3, further comprising said leg portion having a tilting portion which is tiltable in a contact direction with respect said object, a fixed marker is configured to be provided on said link plate, and a movable marker is configured to be provided in a upper surface of said tilting portion, wherein said tilting portion is configured to be energized such that a lower edge protrudes in a direction of said indicator from said leg portion, wherein said leg portion and a lower edge of said tilting portion are flush by being contacted with said object, and said fixed marker and said movable marker coincide with each other.

\* \* \* \* \*